United States Patent
Hughes et al.

(10) Patent No.: US 10,099,799 B2
(45) Date of Patent: Oct. 16, 2018

(54) ARTICULATED BOOM NOZZLE WITH TORSION CABLE REEL

(71) Applicant: THE BOEING COMPANY, Chicago, IL (US)

(72) Inventors: Truman Hughes, Silex, MO (US); Glenn E. Stinson, Collingswood, NJ (US)

(73) Assignee: The Boeing Company, Chicago, IL (US)

( * ) Notice: Subject to any disclaimer, the term of this patent is extended or adjusted under 35 U.S.C. 154(b) by 247 days.

(21) Appl. No.: 14/855,148

(22) Filed: Sep. 15, 2015

(65) Prior Publication Data
US 2017/0073080 A1    Mar. 16, 2017

(51) Int. Cl.
| | |
|---|---|
| *B64D 39/06* | (2006.01) |
| *B65H 75/48* | (2006.01) |
| *H01B 11/10* | (2006.01) |
| *H01R 24/28* | (2011.01) |
| *H01R 13/60* | (2006.01) |

(52) U.S. Cl.
CPC .......... *B64D 39/06* (2013.01); *B65H 75/486* (2013.01); *H01B 11/1033* (2013.01); *B65H 2701/34* (2013.01); *H01R 13/60* (2013.01); *H01R 24/28* (2013.01)

(58) Field of Classification Search
CPC ........ B64D 39/04; B64D 39/02; B64D 39/06; B65H 2701/34; B65H 75/486; H01B 11/1033; H01R 13/60; H01R 24/28
See application file for complete search history.

(56) References Cited

U.S. PATENT DOCUMENTS

| | | | | |
|---|---|---|---|---|
| 2006/0102791 A1* | 5/2006 | Adelson | ................. | B64D 39/04 |
| | | | | 244/135 A |
| 2006/0192053 A1* | 8/2006 | Crangle | ................. | B64D 39/02 |
| | | | | 244/135 R |
| 2014/0346279 A1* | 11/2014 | Foo | ......................... | B64D 39/02 |
| | | | | 244/135 A |
| 2014/0353429 A1* | 12/2014 | Lopez | ................... | B64D 39/06 |
| | | | | 244/135 A |
| 2015/0284107 A1* | 10/2015 | De La Fuente Lopez | ................. | |
| | | | | B64D 39/00 |
| | | | | 244/135 A |
| 2016/0311554 A1* | 10/2016 | Marcos Montes | ..... | B64D 39/04 |
| 2017/0241576 A1* | 8/2017 | Pryce | ...................... | F16L 11/22 |

\* cited by examiner

*Primary Examiner* — Valentina Xavier
(74) *Attorney, Agent, or Firm* — Apogee Law Group P.C.; Francisco A. Rubio-Campos

(57) ABSTRACT

A boom nozzle assembly for use with an aerial refueling boom on an aerial refueling aircraft where a shielded wiring cable from the aerial refueling boom is connected to an articulated boom nozzle through an electrical connection on the wear ring of the articulated boom nozzle and then routed to a solenoid and other devices of the articulated boom nozzle without passing through the universal joint area of the articulated boom nozzle. The boom nozzle assembly may include a torsion cable reel that keeps the shielded wiring cable in tension as the articulated boom nozzle changes its position relative to the boom nozzle assembly. The torsion cable reel may be positioned within a cable reel housing attached at the aft end of the aerial refueling boom.

19 Claims, 10 Drawing Sheets

ARTICULATED BOOM NOZZLE WITH TORSION CABLE REEL

STATEMENT REGARDING FEDERALLY SPONSORED RESEARCH AND DEVELOPMENT

This invention was made with United States Government ("USG") support under Contract Number FA8635-11-C-6600 awarded by the Department of Defense. The USG has certain rights in the invention.

BACKGROUND OF THE INVENTION

1. Field of the Invention

The present disclosure is generally related to aerial refueling booms used in aerial refueling systems and more particularly, to articulated boom nozzles attached to the aerial refueling booms.

2. Related Art

Aerial refueling aircraft utilize aerial refueling booms to transfer fuel from tanks within the aerial refueling aircraft to an aircraft receiving the fuel while in flight. Turning to FIG. 1, an example of an implementation of a known approach to refuel a receiving aircraft 100 with an aerial refueling aircraft 102 utilizing an aerial refueling boom 104 is shown. In this example, the aerial refueling boom 104 is pivotally mounted at one end 106 of the aerial refueling aircraft 102. The aerial refueling boom 104 typically includes an articulated boom nozzle 108 at the opposite end of the aerial refueling boom 104. The articulated boom nozzle 108 connects to a corresponding fuel receptacle on the receiving aircraft 100. The aerial refueling boom 104 may be pivotally mounted to the aerial refueling aircraft 102 via a gimbal-type structure 116 and the aerial refueling boom 104 may be lowered from and raised to the tail 114 of the aerial refueling aircraft 102 via a combination of control surfaces 110 (that typically include elevator and rudder surfaces) and a hoist-cable 112. The aerial refueling boom 104 may comprise two aerodynamically faired tubes with one telescoping within the other, and a sliding seal to provide passage of fuel without leakage. Once the articulated boom nozzle 108 is connected to the fuel receptacle of the receiving aircraft 100, fuel is transferred from the tanks within the aerial refueling aircraft 102 to the receiving aircraft 100 via the aerial refueling boom 104.

The articulated boom nozzle 108 may incorporate a ball joint swivel and a universal joint, both of which provide flexibility to the articulated boom nozzle that is required when making contact with the fuel receptacle of the receiving aircraft 100 and when the aerial refueling aircraft 102 and the receiving aircraft 100 are hooked up. The universal joint is used to transmit impact loads through the articulated boom nozzle to a shock absorber recoil assembly, and the ball joint swivel may allow movement about two independent axes, one in a 60°, for example, conical motion, and the other in a ±30° or ±45°, for example, up and down (elevation) or side to side (azimuth) motion. When the insertion is completed, an automatic load alleviation system (ALAS) may be automatically activated, which provides automatic disconnects of the articulated boom nozzle 108 if preselected limits are exceeded.

Generally, an articulated boom nozzle may be approximately two feet long and may comprise an independent disconnect system (IDS). In one type of an IDS, electrical power is supplied from the aerial refueling aircraft 102 through wiring in the aerial refueling boom 104 that is connected to an electrical connector on the articulated boom nozzle 108, and the IDS may be operated by a boom operator in the aerial refueling aircraft 102 depressing a disconnect switch through the second detent. When the IDS is activated by the boom operator depressing the disconnect switch, an electrical signal is sent to a solenoid that retracts IDS toggle latches on each side of the articulated boom nozzle 108 to a flush position, which allows the aerial refueling boom 104 to be retracted from the receiver aircraft while its receptacles toggles are in the latched/extended position. The IDS toggle latches may have a holding circuit installed that retains them in the retracted position after IDS actuation, until a RESET TO READY button is pushed.

Turning to FIG. 2, a known articulated boom nozzle 200 attached to the aft end of an aerial refueling boom 202 is shown. In FIG. 2, the articulated boom nozzle 200 is attached to the aft end of an aerial refueling boom 202 through a fuel-tight flange 204. Ball 210 is part of a ball and joint swivel that is covered by outlet housing 212, where the ball and joint swivel provides flexibility to the articulated boom nozzle 200 by allowing movement in a conical symmetry about the aerial refueling boom axis. The articulated boom nozzle 200 may include 2 IDS toggle latches, one of which is shown in FIG. 2 as IDS toggle latch 220. The IDS may be an electrically controlled, pneumatically actuated system located in the articulated boom nozzle 200, whereby pneumatic pressure is supplied to the articulated boom nozzle 200 from a compressed air reservoir mounted on the aerial refueling boom 202 through cable 214. In other implementations, electrical power may be supplied from the aerial refueling boom by electrical wiring connected to electrical connectors on the articulated boom nozzle, whereby an electrical signal is sent to a solenoid that retracts the IDS toggle latches or other electrical signals are sent to an induction coil that allows the aerial refueling aircraft and the receiving aircraft to share interphone communications.

FIG. 3 is a section top plan view of a known articulated boom nozzle 300, with the nozzle tip 302 rotated left 30°. Positioned at the forward side of the articulated boom nozzle 300 is closeout ring 304. Wiring (which may be in the form of a shielded twisted-pair cable) for an IDS, a Voice Coil or an induction coil for interphone communications between an aerial refueling aircraft 102 and a receiving aircraft 100, and other signal communications may be connected to the articulated boom nozzle 300 through an electrical connector (not shown) at a 12 o'clock position on the closeout ring 304.

Within the closeout ring 304, the wiring is shown in FIG. 3 as internal wiring 310, which in the case of the wiring for the IDS, passes through a retaining ring 312 to a service loop 314 at the forward end of the articulated boom nozzle 300. The IDS wiring is connected to a solenoid 324, which, when energized by a boom operator in the aerial refueling aircraft, causes an armature 326 to shift along a longitudinal axis of the articulated boom nozzle 300, thus retracting toggle latches 328a and 328b located at the 3 o'clock and 9 o'clock positions, respectively, on the articulated boom nozzle 300. As the articulated boom nozzle 300 deflects, the internal wiring 310 is pulled from service loop 314, and as the articulated boom nozzle 300 returns to its neutral position, the internal wiring 310 is pushed back up the central bore 318 of shaft 320 and into the service loop 314.

As the articulated boom nozzle 300 is deflected, it swivels around the ball 340, causing bearing plate 342 to impinge upon ball saddle 344, thereby compressing ball joint centering spring 346. When the articulated boom nozzle 300 is signaled to return to its neutral position, the tension in the ball joint centering spring 346 assists the return.

The articulated boom nozzle 300 of FIG. 3 allows the operation of boom nozzle toggle latches by a boom operator without depending upon operation of receptacle latches on the receiving aircraft. However, there is a potential wear issue with the internal wiring at the articulating joint and the service loop as the articulated boom nozzle 300 of FIG. 3 is deflected and then returned to its neutral position. Therefore, there is a need for an articulated boom nozzle with an improved internal electrical wiring system that remains stationary while the articulated boom nozzle deflects, and a cable assembly connecting the aft end of an aerial refueling boom to a connector on the articulated boom nozzle, where a torsion cable reel assembly maintains tension on the cable assembly during movement of the articulated boom nozzle.

SUMMARY

An articulated boom nozzle for use with an aerial refueling boom on an aerial refueling aircraft is described, wherein a cable assembly containing electrical wiring for the articulated boom nozzle is connected to an electrical connection on the a ring of the articulated boom nozzle. Once connected, the electrical wiring may be connected to a solenoid and other devices without passing through any point of articulation within the articulated boom nozzle, e.g., the universal joint area. The other end of the cable assembly has a connector that is connected to a connector interface on an aft bulkhead of the aerial refueling boom.

The articulated boom nozzle also includes a torsion cable reel that keeps the cable assembly in tension in order to prevent cable flop as the electrical connection on the articulated boom nozzle is deflected relative to the boom nozzle assembly, where the deflection may be due to articulation of the nozzle tip and recoil mechanism rotation and compression. The torsion cable reel may be positioned within a cable reel housing attached at the aft end of the aerial refueling boom.

In an example, an electrical connection is placed at the 12 o'clock position on a wear ring of the articulated boom nozzle, where the cable assembly extending from the torsion cable reel is connected to the electrical connection. From the electrical connection, the internal wiring contained within the shielded wiring cable is routed inside the wear ring around the outside of the articulated boom nozzle and under a wire cover at the bottom of the articulated boom nozzle to, as an example, a solenoid that energizes IDS toggle latches in the articulated boom nozzle. Other electrical wiring within the shielded wiring cable may be connected to other devices, such as sensors, microprocessors, terminals, etc.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

An articulated boom nozzle attached to an aerial refueling boom is described, wherein a cable assembly comprising shielded electrical wiring, a housing plug, and a nozzle plug is connected to an electrical connection on a wear ring of the articulated boom nozzle. The articulated boom nozzle contains internal electrical wiring routed from the electrical connector to various devices and terminals within the articulated boom nozzle without passing through any point of articulation within the articulated boom nozzle, and this internal electrical wiring remains stationary and not under load as the articulated boom nozzle deflects under load. The articulated boom nozzle also includes a torsion cable reel that keeps the cable assembly in tension as the articulated boom nozzle is deflected during aerial refueling operations.

Figure 1:
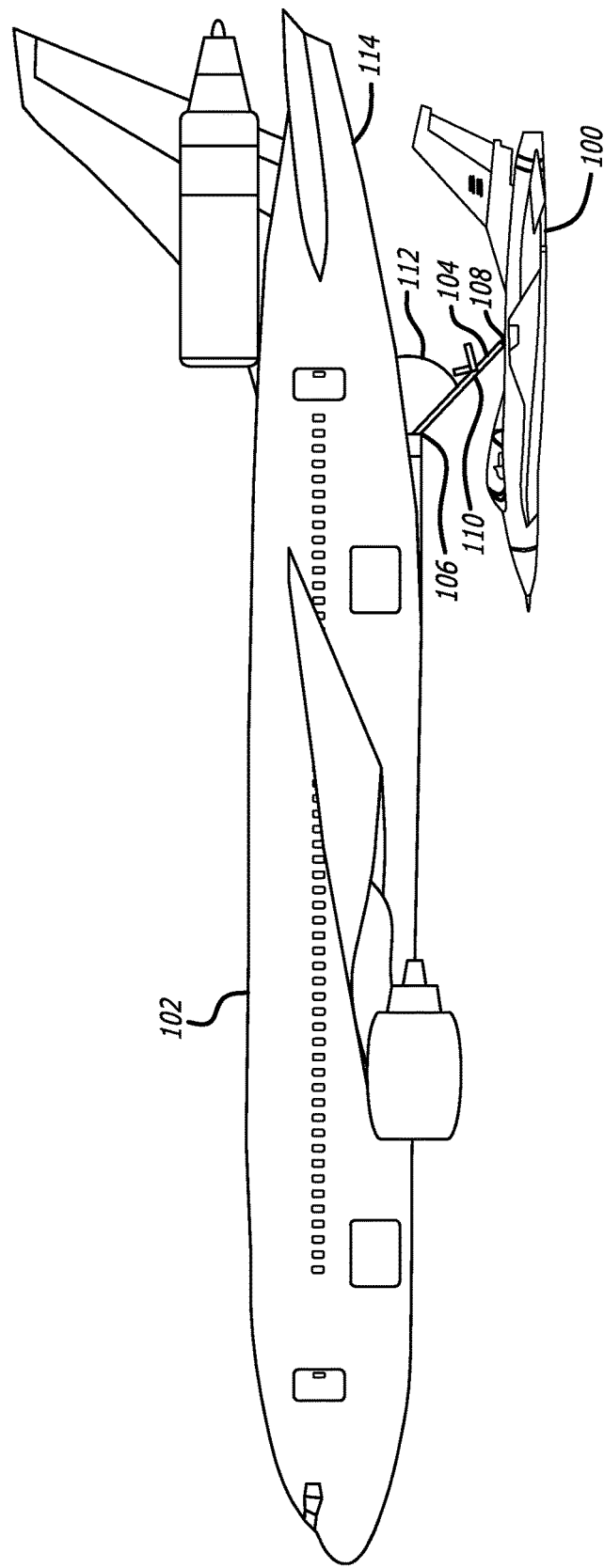
FIG. 1 is diagram of an example of an implementation of a known refueling boom transferring fuel from a refueling aircraft and receiving aircraft.
Figure 2:
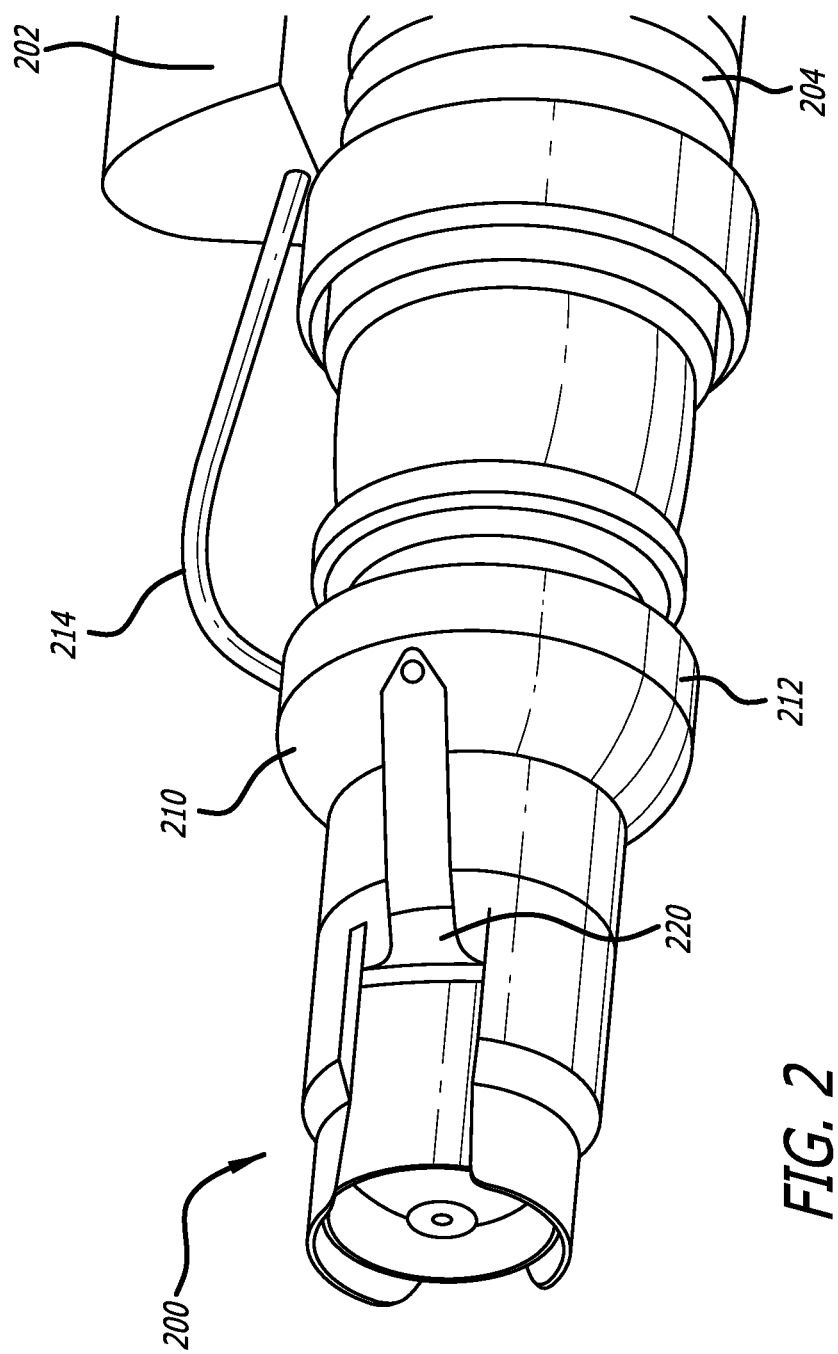
FIG. 2 is side perspective view of an example of an implementation of a known boom nozzle assembly attached to the aft end of an aerial refueling boom.
Figure 3:
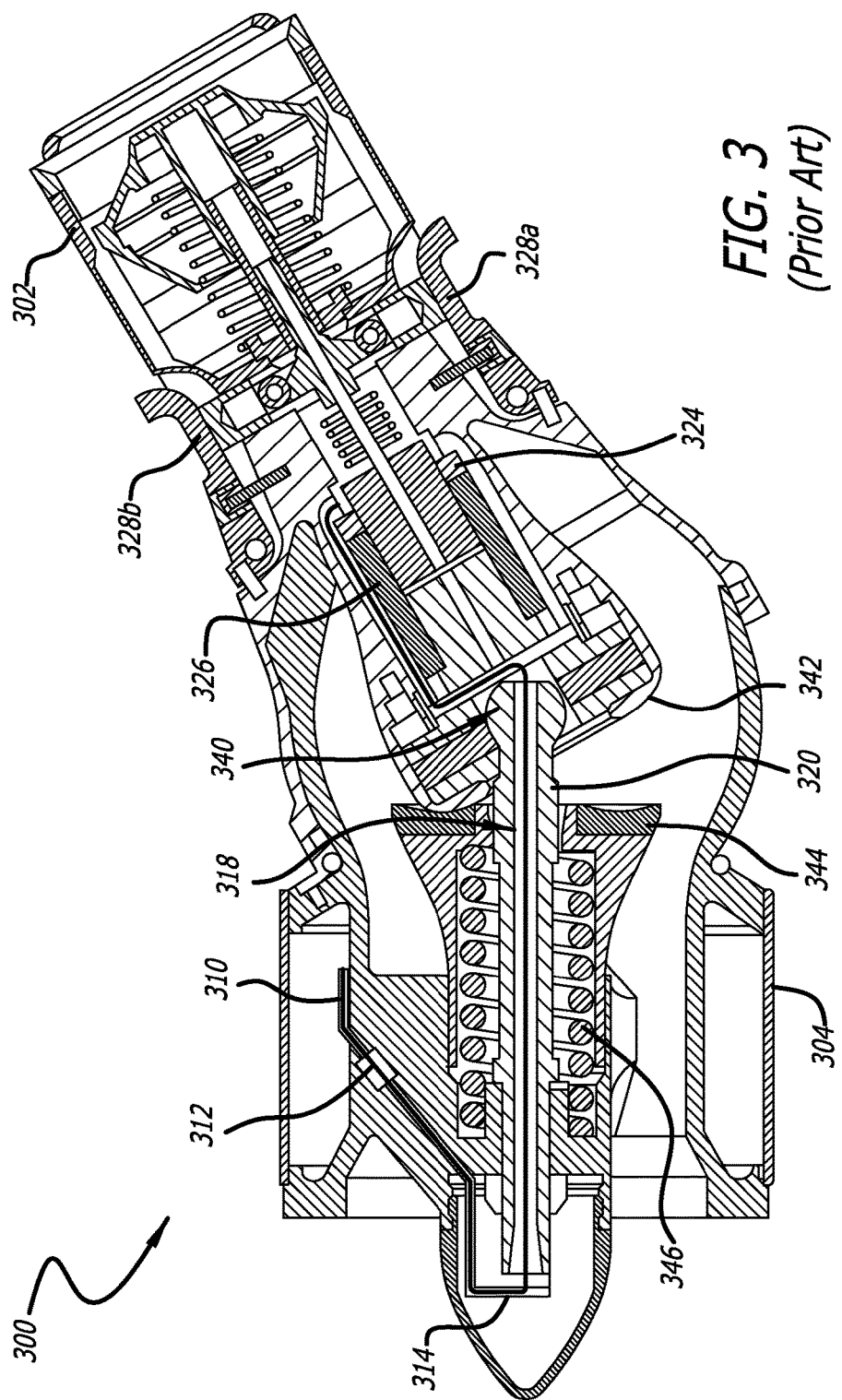
FIG. 3 is section top view of a known articulated boom nozzle.
Figure 4:
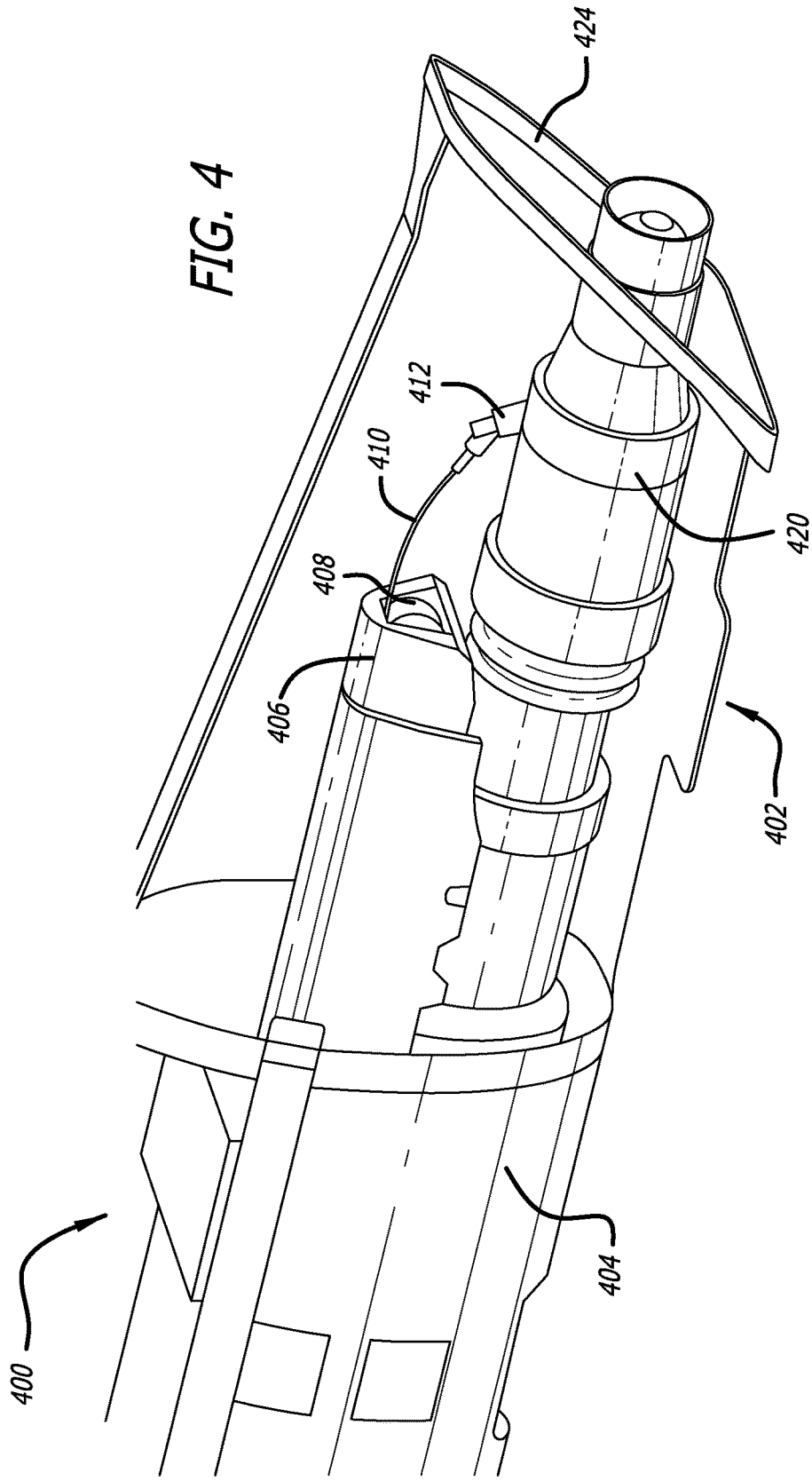
FIG. 4 is top perspective view of a boom nozzle assembly comprising an articulated boom nozzle, a torsion cable reel, and a cable assembly in accordance with the present disclosure shown attached to the aft end of an aerial refueling boom.

FIG. 4 is top perspective view of a boom nozzle assembly 400 in accordance with the present disclosure. In FIG. 4, articulated boom nozzle 402 is attached to the aft end of aerial refueling boom 404. Also affixed to the aft end of aerial refueling boom 404 is cable reel housing 406, which covers a torsion cable reel 408 (shown only partially). Extending from the torsion cable reel 408 is a shielded cable assembly 410 connected to electrical connection 412, which is positioned at the 12 o'clock position on wear ring 420 of articulated boom nozzle 402. As articulated boom nozzle 402 rotates in a cone with a longitudinal axis along the aerial refueling boom 404 or in an elevation or azimuth plane through the longitudinal axis, torsion cable reel 408 adjusts the length of the shielded cable assembly 410 accordingly while maintaining tension in the shielded wiring cable assembly 410. Also shown is a shroud frame 424 which supports a shroud (not shown) when the boom nozzle assembly 400 is completely assembled and attached to the aerial refueling boom 404.

Figure 5:
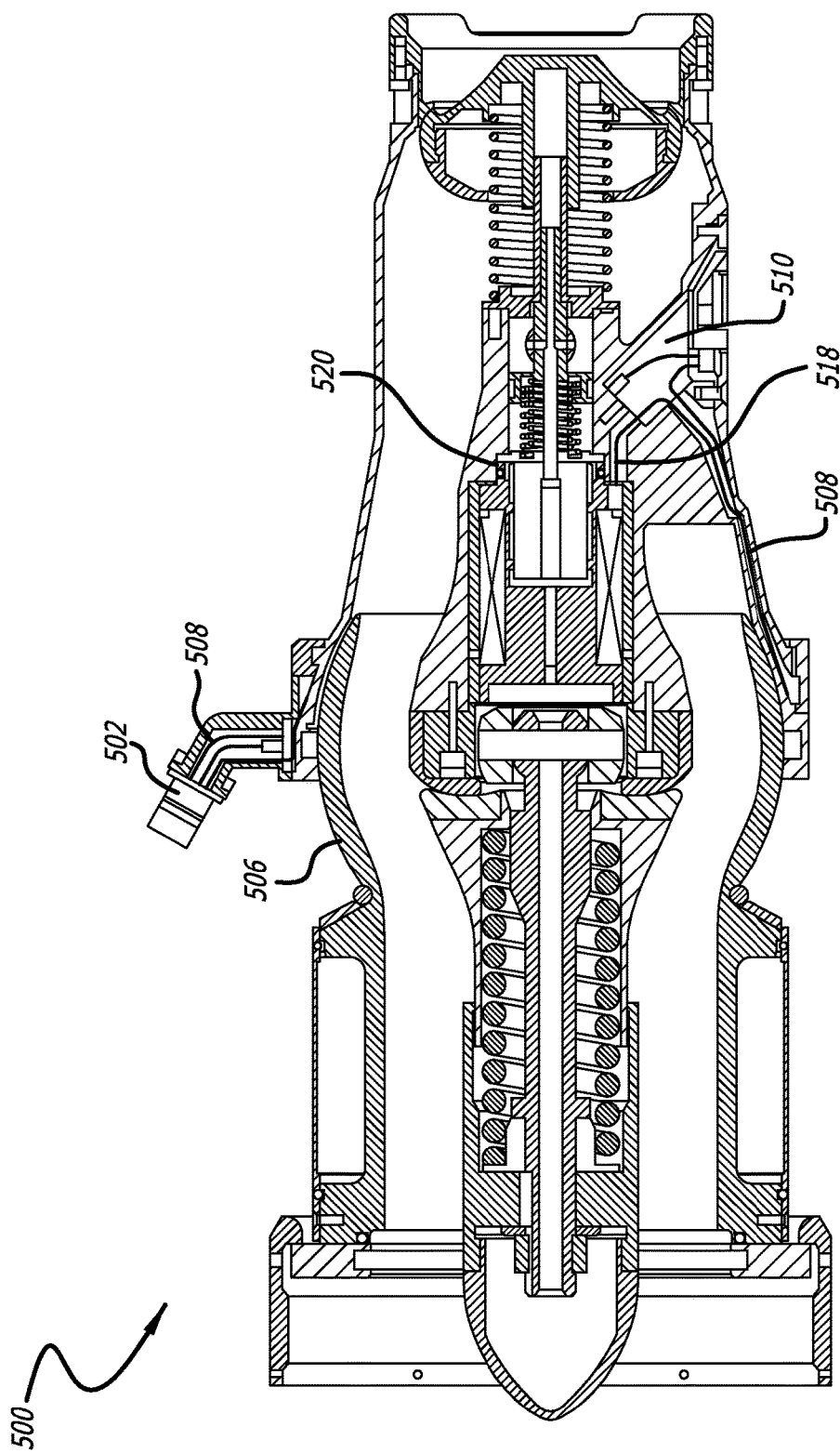
FIG. 5 is a section longitudinal side view of an articulated boom nozzle in accordance with the present disclosure.

FIG. 5 is a section longitudinal side view of an articulated boom nozzle 500 in accordance with the present disclosure. Electrical connection 502 is shown positioned at the 12 o'clock position on wear ring 506 of articulated boom nozzle 500. The internal wiring 508 is contained within the shielded wiring cable (not shown) that is connected to electrical connection 502. The internal wiring 508 is routed around the outside of the articulated boom nozzle 500 under the wear ring 506, and the internal wiring 508 is passed through a wire passage 510 in the bottom of the articulated boom nozzle 500. From the wire passage 510, the wiring for various signal communications comprising the internal wiring 508 are routed to the appropriate devices, sensors, microprocessors, etc., contained within the articulated boom nozzle 500. In FIG. 5, a wiring connection 518 to a solenoid 520 that controls toggle latches in the articulated boom nozzle 500 is shown.

In FIG. 6A, a perspective view of an example implementation of an assembled torsion cable reel assembly 602 in accordance with present disclosure is shown. In FIG. 6B, the assembled cable reel assembly 602 of FIG. 6A, which comprises elements 610-626, is shown in an exploded view.

Reel mount 610 may be attached to a right-hand side of a reel housing attached to the aft end of an aerial refueling boom (not shown) and which supports the cable reel assembly 602 within the reel housing. Attached to the reel mount 610 is bearing plate 612 and spiral spring 614. Next, washer assembly 616 is shown, which comprises, right to left, a keyed washer, a plain bearing, and a thrust washer. The washer assembly 616 supports reel hub 618 on the reel mount 610, with washer assembly 622 comprising, right to left, a plain bearing, a keyed washer, a thrust washer, and a retaining ring. Next, cable assembly 624 is shown, which is described in more detail in the FIGs. that follow. These parts are kept in place in the assembled cable reel assembly 602 by reel hub cover 626.

Figure 6:
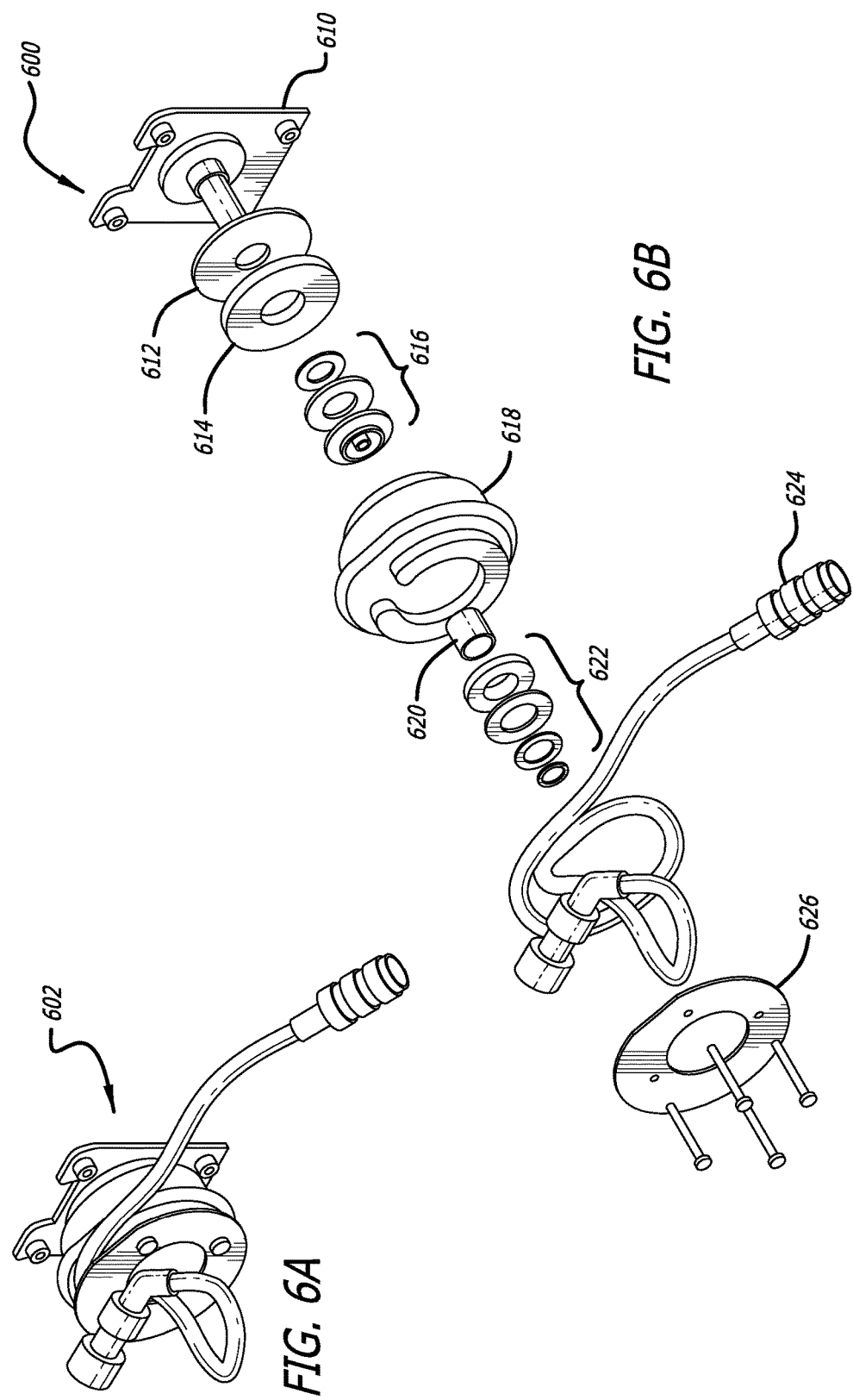
FIG. 6A is perspective view of an example implementation of a torsion cable reel assembly in accordance with the present disclosure.
FIG. 6B is an exploded view of the example implementation of a torsion cable reel shown in FIG. 6A.
Figure 7:
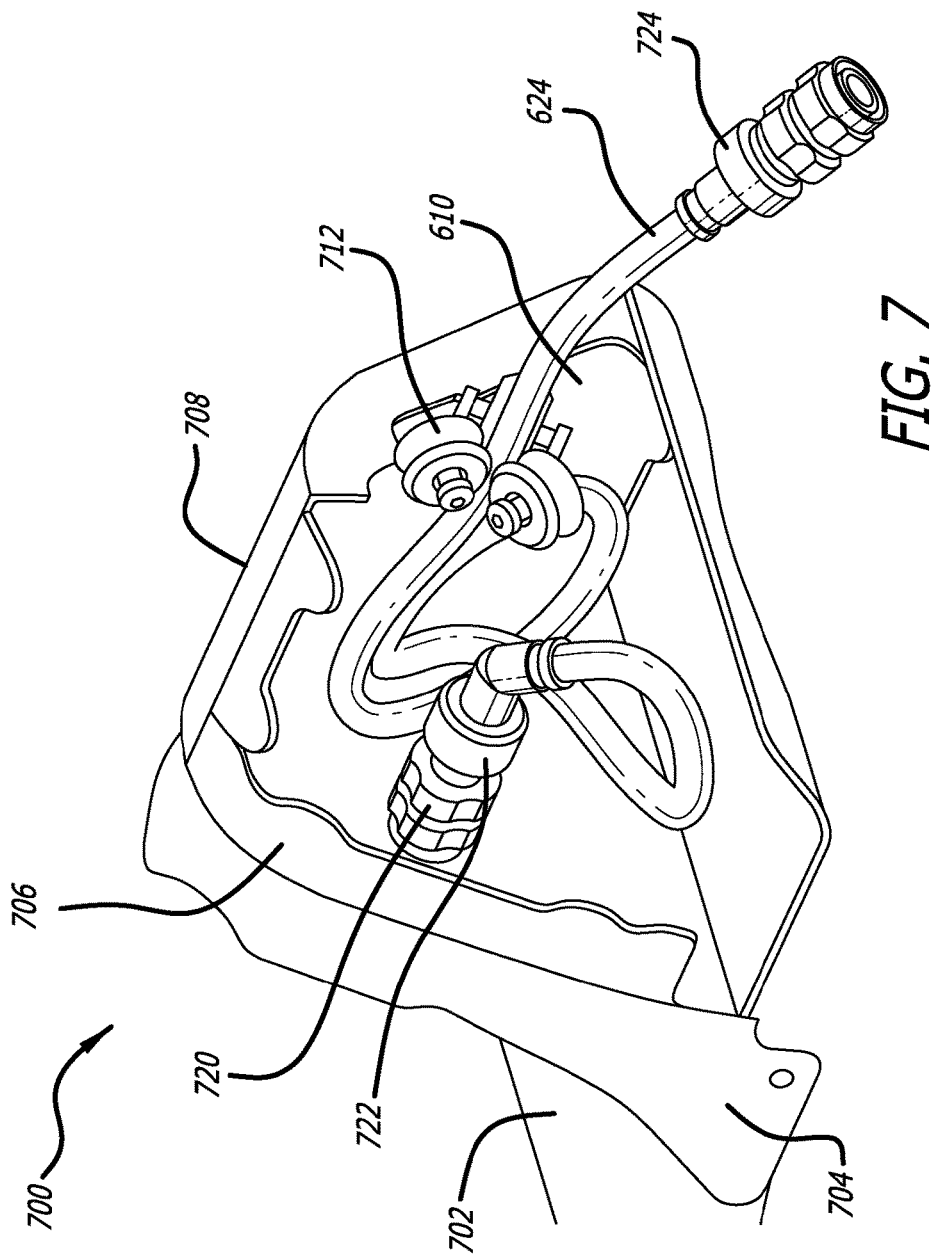
FIG. 7 is a cut-away perspective view of a torsion cable reel assembly reel in accordance with the present disclosure positioned within a reel housing attached to the aft end of an aerial refueling boom.

Turning to FIG. 7, a cut-away perspective view of a torsion cable reel assembly 700 in accordance with the present disclosure is shown positioned within a reel housing that is attached to the aft end of an aerial refueling boom. An aft end bulkhead 704 is attached to the aft end of aerial refueling boom 702. The aft end bulkhead 704 may include an aft flange 706, configured to interface with a cable reel housing that supports a cable reel assembly. The reel housing may comprise a right-hand side, a left-hand side, a rear close-out panel, and a lower close-out panel. In FIG. 7, a right-hand side 708 of a reel housing that supports a cable reel assembly, such as cable reel assembly 602 of FIG. 6, is shown attached to the aft flange 706.

Attached to the right-hand side 708 of the reel housing is the reel mount 610 of cable reel assembly 602. Coiled around the reel hub 618 is cable assembly 624, where tension is provided by helical spring 614. In different implementations, helical spring 614 may be configured to provide a maximum tension in the cable reel assembly 602 that will vary; as an example, a maximum tension may be approximately 20 lbs. when the articulated boom nozzle is farthest from its neutral position, with a maximum spring torque of approximately 29.0 to 32.4 Lb-In. To assist in transmitting tension to the articulated boom nozzle through cable assembly 624, the cable reel assembly may also include a set of guide rollers 712 that assist in moving the cable assembly 624 as the articulated boom nozzle 422 of FIG. 4 rotates around a longitudinal axis. In FIG. 7, three guide rollers 712 are shown, which may be attached to a rear close-out panel (not shown) of the reel housing.

Also shown in FIG. 7 is bulkhead receptacle 720, which is attached to the aft end bulkhead 704. The aft end bulkhead 704 includes a connector interface (not shown), through which electrical wiring is passed through the aft end bulkhead 704 when the bulkhead receptacle 720 is connected to connector 722 of cable assembly 624. The cable assembly 624 carries electrical wiring, such as, for example, twisted-pairs for the IDS and the Voice Coil, from the aerial refueling boom through the cable reel assembly to the electrical connection on the articulated boom nozzle, and is also configured to provide tension to the articulated boom nozzle. The cable assembly 624 may include metal braided shielding for electromagnetic interface (EMI) protection. The cable assembly 624 also includes a housing connector or plug 722 and a nozzle connector or plug 724, which may be stainless steel connectors that are different so as to prevent mis-mating of the cable assembly 624. Housing plug 722 is configured for connection to bulkhead receptacle 720 and nozzle 724 configured for connection to electrical connector 502 of FIG. 5.

Figure 8:
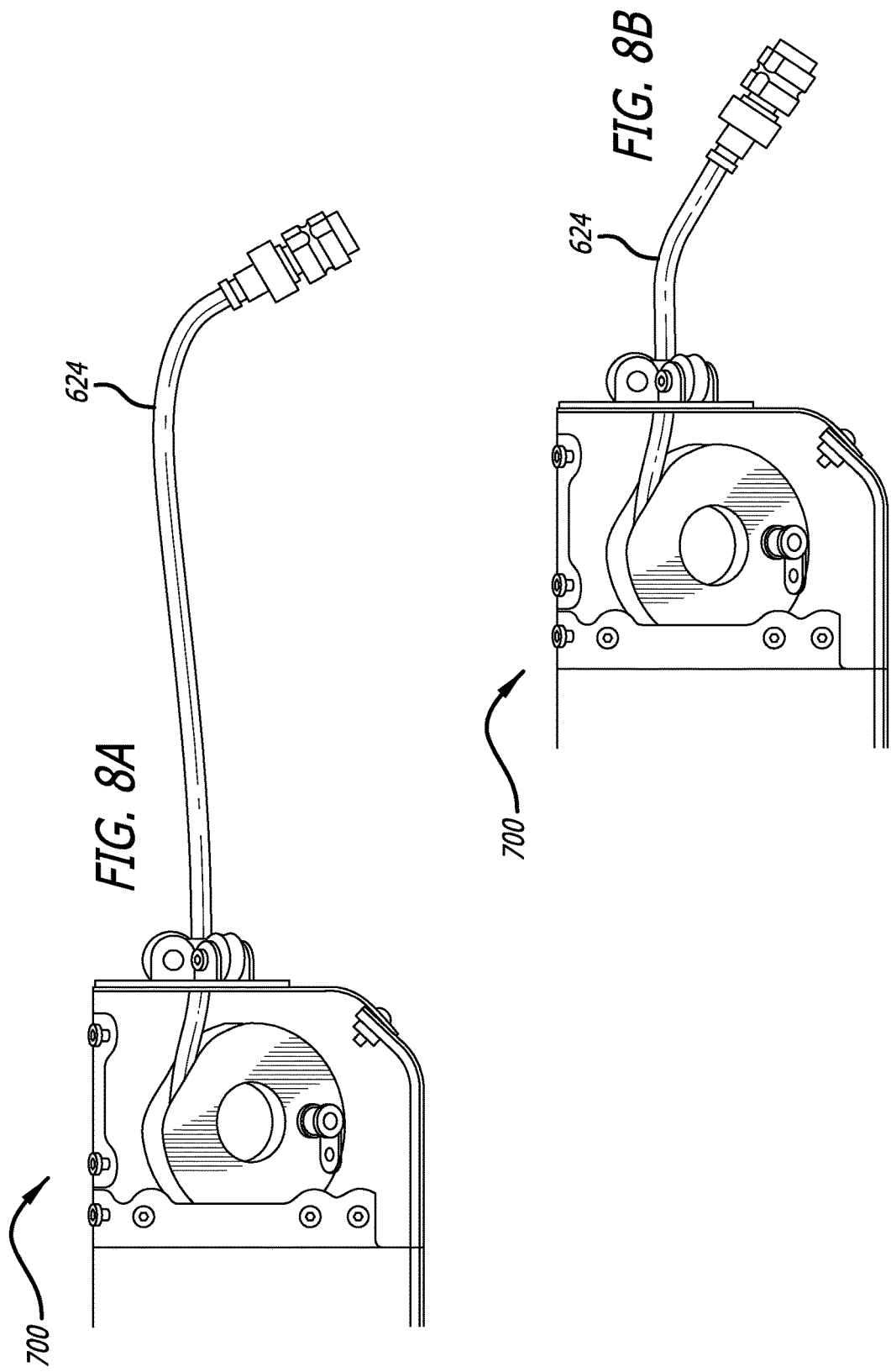
FIG. 8A is a cut-away side perspective view of a torsion cable reel in accordance with the present disclosure positioned within a reel housing with the cable assembly of the torsion cable reel in a fully-extended position.
FIG. 8B is a cut-away side perspective view of the torsion cable reel of FIG. 8B with the cable assembly of the torsion cable reel in a fully-retracted position.

FIG. 8A is a cut-away side perspective view of the torsion cable reel assembly 700 shown in FIG. 7 with the cable assembly 624 of the torsion cable reel assembly 700 shown in a fully-extended position, and FIG. 8B is a view of the torsion cable reel assembly 700 with the cable assembly 624 of the torsion cable reel assembly 700 shown in a fully-retracted position. As an example, in this embodiment of a torsion cable reel assembly for a particular refueling aircraft, the shortest cable length may be 6.13" and the longest cable length may be 14.53", thus resulting in a the cable assembly delta ($\Delta_{cable}$) of approximately 8.40", where $\Delta_{cable}$ represents the cable assembly length required to accommodate the maximum movement of the articulated boom nozzle for a particular aerial refueling aircraft from its neutral position.

Figure 9:
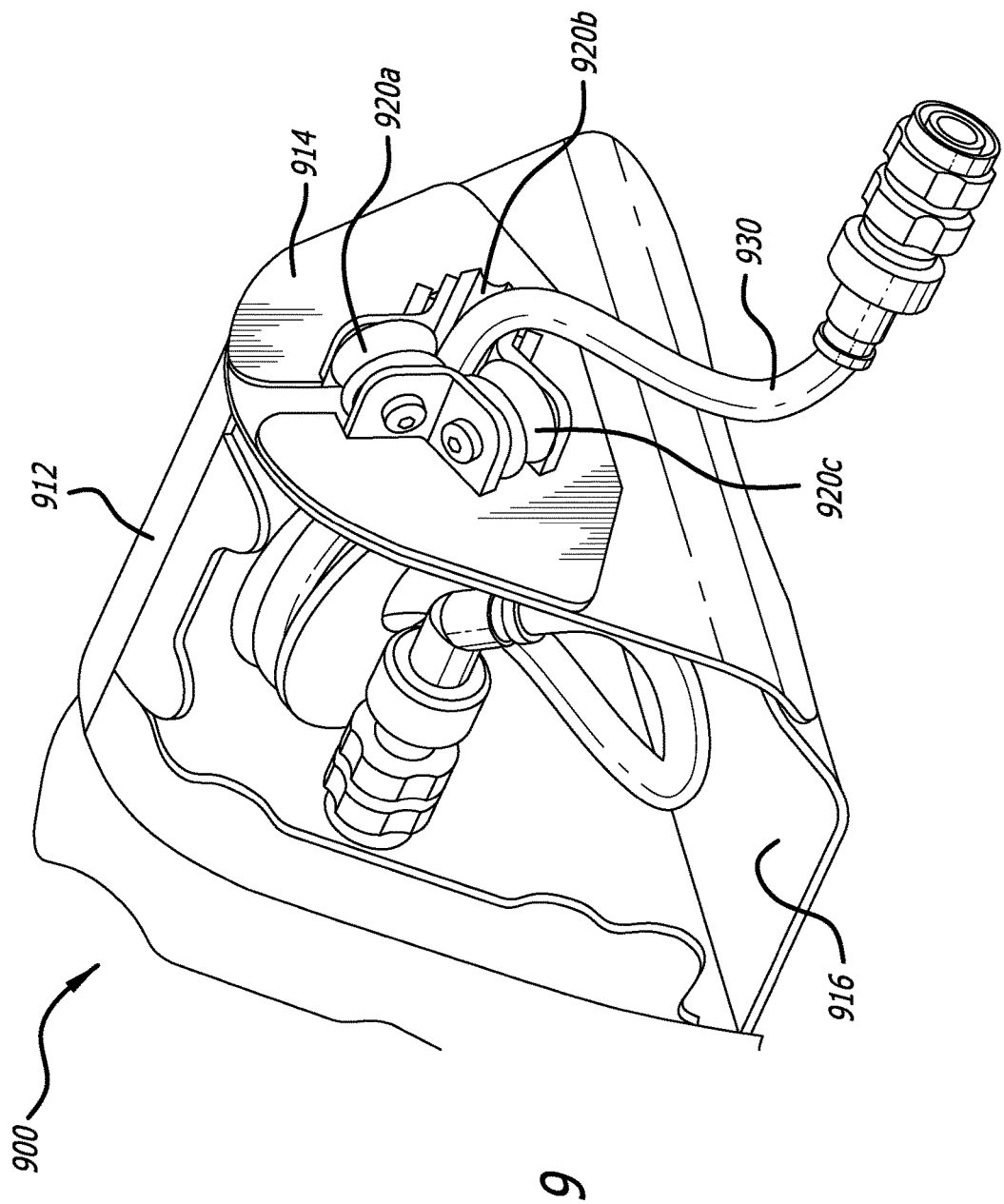
FIG. 9 is a cut-away rear perspective view of a torsion cable reel assembly in accordance with the present disclosure positioned within a reel housing comprising a right-hand side, a rear close-out panel, and a lower close-out panel.

FIG. 9 is a cut-away side perspective view of a torsion cable reel assembly 900 positioned in a reel housing comprising a right-hand side 912, rear close-out panel 914, and a lower close-out panel 916. Attached to the rear close-out panel 914 are roller guides 920a, 920b, and 920c. As cable assembly 930 is extended from and retracted into the reel housing in response to movements of the articulated boom nozzle, roller guides 920a, 920b, and 920c, support and guide these movements of cable assembly 930.

Figure 10:
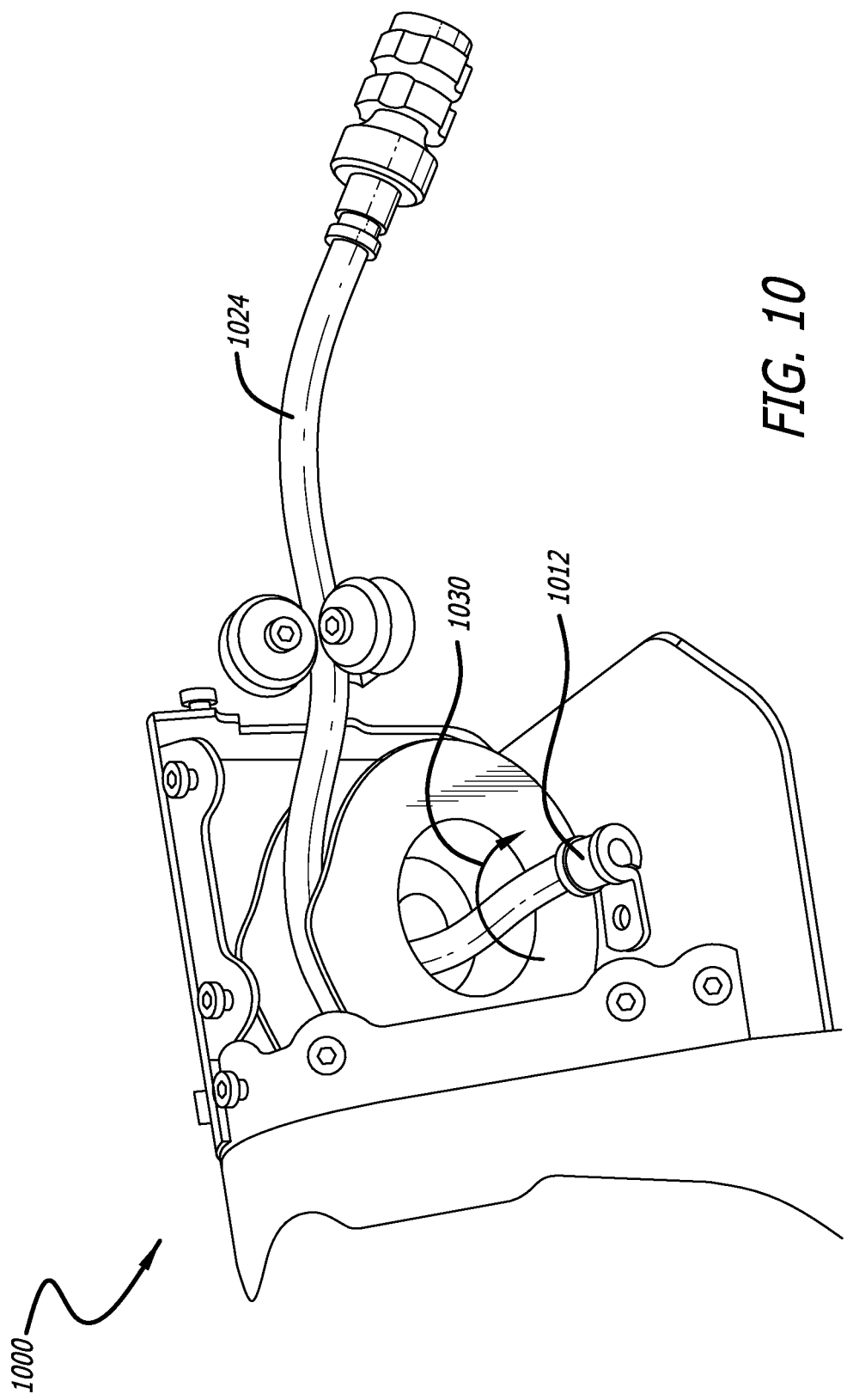
FIG. 10 is a cut-away rear perspective view of another example implementation of torsion cable reel in accordance with the present disclosure positioned within a reel housing.

Turning to FIG. 10, another cut-away rear perspective view of another example implementation of a torsion cable reel assembly 1000 in accordance with the present disclosure is shown in order to illustrate the use of clamp 1012 to support the twisting of cable assembly 1024 as it extends from the reel housing. During the assembly of the torsion cable reel assembly 1000, the cable assembly 1024 is pre-loaded by being twisted in a direction opposite to the direction of the reel hub (which is indicated by arrow 1030). After this pre-loading, clamp 1012 is tightened, holding cable assembly 1024 in place between the clamp 1012 and the bulkhead receptacle (not shown). This allows that portion of the cable assembly 1024 between the clamp 1012 and the reel hub to untwist as the cable assembly 1024 extends from the reel housing. The cable assembly 1024 may be twisted 2 turns per foot in a direction opposite to the direction of the reel hub.

It will be understood that various aspects or details of the invention may be changed without departing from the scope of the invention. It is not exhaustive and does not limit the claimed inventions to the precise form disclosed. Furthermore, the foregoing description is for the purpose of illustration only, and not for the purpose of limitation. Modifications and variations are possible in light of the above description or may be acquired from practicing the invention. The claims and their equivalents define the scope of the invention.

What is claimed is:

1. An aerial refueling system for aerial refueling by an aerial refueling aircraft of a receiving aircraft, the aerial refueling system comprising:
    a refueling boom connected to the aerial refueling aircraft;
    an articulated boom nozzle assembly connected to an aft end of the refueling boom; and
    a torsion cable reel assembly holding a shielded cable assembly in tension, where the torsion cable reel assembly is attached to the aft end of the articulated refueling boom and the shielded cable assembly is attached to an electrical connector on the articulated boom nozzle.

2. The aerial refueling system of claim 1, wherein the articulated boom nozzle comprises an articulated boom nozzle comprising an independent disconnect system (IDS).

3. The aerial refueling system of claim 1, wherein the articulated boom nozzle further comprises:
    a wear ring;
    an electrical connector positioned at the 12 o'clock position of the wear ring configured for connection to the shielded cable assembly.

4. The aerial refueling system of claim 3, wherein the torsion cable reel assembly comprises:
    a helical reel, wherein the shielded cable assembly is wrapped around the helical reel;
    a helical spring that provides torsion to the helical reel;
    a cable assembly connected to the helical reel, configured to retractably extend from the helical reel;
    a spring housing covering the helical reel and the helical spring; and
    a reel housing covering the helical reel, the helical spring, the cable assembly, and the spring housing.

5. The aerial refueling system of claim 4, wherein the reel housing comprises:
    a right-hand side;
    a left-hand side;
    a rear close-out panel; and
    a lower close-out panel.

6. The aerial refueling system of claim 5, wherein the rear close-out panel comprises a plurality of guide rollers configured to support and guide the cable assembly as it extends from and retracts into the reel housing.

7. The aerial refueling system of claim 2, wherein the aerial refueling aircraft is a Boeing KC-46 military aerial refueling aircraft.

8. The aerial refueling system of claim 7, wherein the torsion cable reel assembly provides 20 lbs. of tension between the torsion cable reel assembly and the boom nozzle assembly when the shielded cable assembly is fully extended from the torsion cable reel assembly.

9. The aerial refueling system of claim 8, wherein a length of the shielded cable assembly fully retracted is 6.13" and a length of the shielded cable assembly fully extended is 14.53", resulting in a cable assembly delta ($\Delta_{cable}$) of approximately 8.40".

10. The aerial refueling system of claim 8, wherein the shielded cable assembly further comprises a metal braided shielded electrical wiring cable containing twisted pairs for the IDS and a Voice Coil for interphone communication between the aerial refueling aircraft and the receiving aircraft.

11. The aerial refueling system of claim 10, wherein the shielded cable assembly further comprises a nozzle plug at a first end of the shielded cable assembly configured to be connected to an electrical connection on the articulated boom nozzle and a housing plug at a second end of the cable assembly configured to be connected to a bulkhead receptacle positioned at the aft end of the aerial refueling boom.

12. The aerial refueling system of claim 11, wherein the aft end of the aerial refueling boom bulkhead comprises a bulkhead having a connector interface configured for connection with the housing plug.

13. A torsion cable reel assembly adapted to connect electrical wiring from an aerial refueling boom of an aerial refueling aircraft to an electrical connector on an articulated boom nozzle of the aerial refueling boom and provide tension to the articulated boom nozzle, the assembly comprising:
    a helical reel having a groove adapted to receive a shielded wiring cable;
    a helical spring that provides torsion to the helical reel;
    a cable assembly wrapped around the helical reel and configured to be retractably extended from the helical reel;
    a spring housing covering the helical reel and the helical spring; and
    a reel housing covering the helical reel, the helical spring, the cable assembly, and the spring housing.

14. The torsion cable reel assembly of claim 13, where the cable assembly comprises a metal braided shielded wiring cable having a nozzle plug at a first end of the cable assembly configured to be connected to an electrical connection on the articulated boom nozzle and a housing plug at a second end of the cable assembly configured to be connected to a bulkhead receptacle positioned at the aft end of the aerial refueling boom.

15. The torsion cable reel assembly of claim 14, wherein the cable assembly further comprises a shielded electrical wiring cable containing twisted pairs for an independent disconnect system (IDS) and a Voice Coil for interphone communication between the aerial refueling aircraft and a receiving aircraft.

16. The torsion cable reel assembly of claim 13, wherein the reel housing comprises:
    a right-hand side;
    a left-hand side;
    a rear close-out panel; and
    a lower close-out panel.

17. The torsion cable reel assembly of claim 16, wherein the rear close-out panel comprises a plurality of guide rollers configured to support and guide the cable assembly as it extends from and retracts into the reel housing.

18. The torsion cable reel assembly of claim 13, wherein the helical spring provides tension to the cable assembly whenever the articulated boom nozzle moves from its neutral position.

19. The torsion cable reel assembly of claim 18, wherein maximum tension is provided by the helical spring to the cable assembly when the articulated boom nozzle has moved farthest from its neutral position.

* * * * *